United States Patent [19]

Shimizu et al.

[11] Patent Number: 5,094,776
[45] Date of Patent: Mar. 10, 1992

[54] LIQUID CRYSTAL COMPOSITION

[75] Inventors: Itsuo Shimizu, Chiba; Kenji Furukawa, Kanagawa; Masami Tanaka, Chiba, all of Japan

[73] Assignee: Chisso Corporation, Osaka, Japan

[21] Appl. No.: 381,411

[22] PCT Filed: Nov. 17, 1988

[86] PCT No.: PCT/JP88/01157
§ 371 Date: Jul. 11, 1989
§ 102(e) Date: Jul. 11, 1989

[87] PCT Pub. No.: WO89/04859
PCT Pub. Date: Jun. 1, 1989

[30] Foreign Application Priority Data

Nov. 17, 1987 [JP] Japan .................. 62-290369

[51] Int. Cl.$^5$ .................. C09K 19/12; C09K 19/52
[52] U.S. Cl. .................. 252/299.66; 252/299.01
[58] Field of Search .................. 252/299.66, 299.01

[56] References Cited

U.S. PATENT DOCUMENTS

| 3,947,375 | 3/1976 | Gray et al. | 252/299.66 |
| 4,053,431 | 10/1977 | Scherrer et al. | 252/299.66 |
| 4,069,167 | 1/1978 | Inukai et al. | 252/299.66 |
| 4,112,239 | 9/1978 | DuBois et al. | 252/299.66 |
| 4,551,264 | 11/1985 | Eidenschink et al. | 252/299.62 |

FOREIGN PATENT DOCUMENTS

| 60-144383 | 7/1985 | Japan | 252/299.66 |
| 60-252686 | 12/1985 | Japan | 252/299.66 |
| 61-268790 | 11/1986 | Japan | 252/299.66 |
| 61-275385 | 12/1986 | Japan | 252/299.66 |

Primary Examiner—John S. Maples
Assistant Examiner—Philip Tucker
Attorney, Agent, or Firm—Leydig, Voit & Mayer

[57] ABSTRACT

The present invention relates to a liquid crystal composition used for thermal writing type liquid crystal display devices utilizing a thermooptical effect, and a liquid crystal display element using the composition.

The object of the present invention is to provide a liquid crystal composition having an extremely narrow nematic range and a low-melting phase transition point, and also to provide a liquid crystal display element using the composition.

The present invention is directed to a liquid crystal composition mainly comprising a component A comprising 4-n-octyl-4'-cyanobiphenyl, 4-n-dodecyl-4'-cyanobiphenyl and at least one member of 4-n-alkyl-4'-cyanobiphenyls represented by the formula (I),

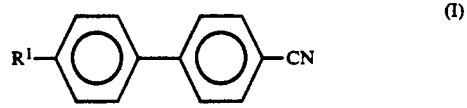

wherein $R^1$ is an alkyl group of 9, 10 or 11 carbon atoms, and a component B comprising at least one member of 4-n-alkanolyloxy-4'-cyanobiphenyls represented by the formula (II)

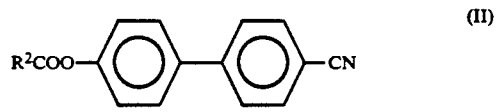

wherein $R^2$ is an alkyl group of 8 or 9 carbon atoms, and at least one member of 4-n-alkanoyloxy-4'-cyanobiphenyls represented by the formula (III)

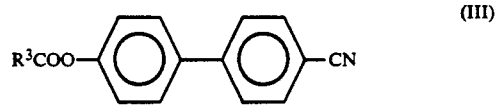

wherein $R^3$ is an alkyl group of 10, 11 or 12 carbon atoms, the ratio of the component A to the component B being in the range of 95:5 to 45:55.

The liquid crystals composition may further comprise at least one member of 4-n-alkoxy-4'-cyanobiphenyls represented by the formula (IV)

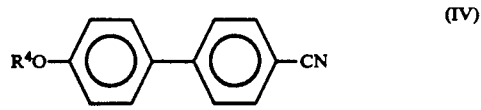

wherein $R^4$ is an alkyl group of 8 to 12 carbon atoms.

9 Claims, No Drawings

LIQUID CRYSTAL COMPOSITION

INDUSTRIAL FIELD

The present invention relates to a liquid crystal composition used for liquid crystal display devices of a thermally addressing type utilizing a thermooptical effect, and this liquid crystal composition is characterized by having an extremely narrow nematic phase and also having a low-melting smectic phase.

BACKGROUND ART

In recent years, the development of liquid crystal display elements is remarkable, and these display elements are mostly directed to the application of nematic liquid crystals. On the other hand, liquid crystal displays of different driving modes, utilizing characteristics of other liquid crystal phases have also been intensively researched for practical use, and as one of these devices, there is a thermal writing projection device utilizing a thermooptical effect of a smectic A phase. The mode of such a device can provide a display of a far larger area and a far higher capacity in the number of figures, as compared with a conventional TN mode (twisted nematic mode).

Characteristics required for the liquid crystal materials used in this field include the following:

(1) a wide smectic A phase range (preferably, a smectic A phase range down to 0° to −20° C.), (2) an extremely narrow nematic phase range, (3) a high birefringence index, (4) a small specific heat and a low phase transition energy; and (5) a large dielectric anisotropy value.

Of these requirements, the items (1), (2) and (3) are considered to be important for improving the quality level of display such as contrast on a projected screen. As to liquid crystal materials having the above-mentioned characteristics, no single compound has yet been found, and hence mixtures of various liquid crystal compounds have now been investigated. Examples of these liquid crystal compounds can be represented by the following general formulae:

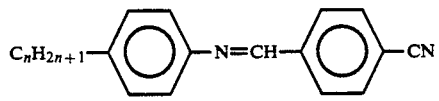

(I)

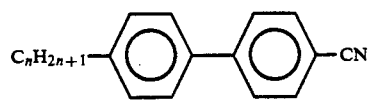

(II)

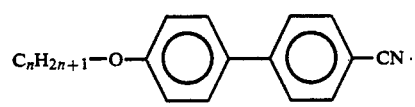

(III)

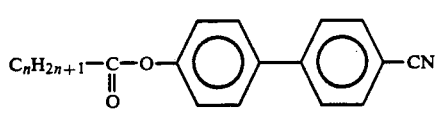

(IV)

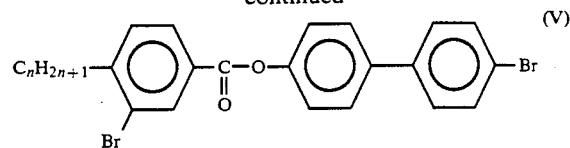

(V)

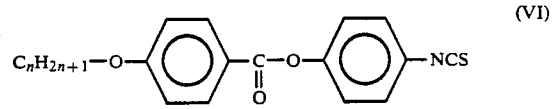

(VI)

Furthermore, examples of compositions of these compounds are set forth in Table 1.

TABLE 1

| Composition | Compounds | mp (°C.) | SN (°C.) | NI (°C.) | NR (°C.) |
|---|---|---|---|---|---|
| a | $I_8, I_{10}, I_{15}$ | 24 | 73.5 | 74 | 0.5 |
| b | $II_8, II_{10}$ | 12 | 37 | 42 | 5 |
| c | $II_8, II_{10}, V_8$ | 6 | 53 | 56 | 3 |
| d | $II_8, II_{10}, IV_9$ | 8 | 41.5 | 47 | 5.5 |
| e | $II_8, III_{10}, IV_9$ | −30 | 46.8 | 51.0 | 3.2 |
| f | $II_8, II_{10}, III_{10}$ $III_{12}, IV_9, VI_8$ | −32.7 | 54.7 | 57.3 | 2.6 |

In Table 1, the respective abbreviations have the following meanings:
mp: Melting point (°C.)
SN: Smectic/nematic transition point (°C.)
NI: Nematic/isotropic transition point (°C.)
NR: Nematic range (°C.)
[= NI point (°C.)—SN point (°C.)]

In the column labelled "Compound" in the table, for example, $I_8$ means the compound of n=8 of Formula (I), mentioned above.

With regard to the composition a, the nematic range is as extremely narrow as 0.5° C., but the melting point is as high as 24° C., which is in the vicinity of room temperature. Therefore, this composition is difficult for practical use, though it seems to be usable in experiments. On the other hand, with regard to the compositions e and f, the melting points are as low as −30° C. and −32.7° C., respectively, but the nematic ranges are as wide as 3.2° C. and 2.6° C., respectively. Thus these compositions are not always satisfactory.

The nematic range is a factor which has an influence on the writing rate and the display contrast of the display elements, and when the nematic range is wide, the writing rate is low and the contrast also is inferior. That is, when thermal writing is carried out within a wide nematic range, a long cooling time is required in the nematic phase in the step of forming an opaque smectic phase from an isotropic liquid via a nematic phase, which constitutes a factor of retarding the writing rate. Furthermore, when the nematic phase state remains for a long period of time, the liquid crystal is oriented by a substrate subjected to an orientation treatment (vertical orientation or homogeneous orientation), so that no scattered smectic A phase can be obtained, which constitutes a factor in deteriorating the contrast.

With regard to the melting point, if it is 0° C. or lower, the compositions are considered to be suitable for typical uses. Because the thermal writing type liquid crystal device is used indoors, it can be considered that the device is usually not used in an environment of 0° C. or lower.

In addition to the above-mentioned compositions, the other thermal writing liquid crystal compositions are disclosed in Japanese Patent Application Laid-open Publication Nos. 144383/1985, 252686/1985, 268790/1986, etc. but compositions having a nematic range of 2° C. or lower and at the same time a melting point of 0° C. or lower have not yet been found.

The object of the present invention is to provide a liquid crystal composition for thermal writing liquid crystal device elements, and a liquid crystal display element using the composition, and more specifically, a liquid crystal composition having characteristics of an extremely narrow nematic range and a low-melting phase transition point, and a thermal writing liquid crystal device element using the composition.

DISCLOSURE OF INVENTION

The present inventors have made intensive research in order to solve the above-mentioned problems of the prior art, and as a result have obtained a liquid crystal composition having a nematic range of 2° C. or lower and a melting point of 0° C. or lower. Thus, the present invention has been accomplished.

The first specific feature of the present invention is directed to a liquid crystal composition mainly comprising a component A comprising 4-n-octyl-4'-cyanobiphenyl, 4-n-dodecyl-4'-cyanobiphenyl and at least one member of 4-n-alkyl-4'-cyanobiphenyls represented by the formula (I)

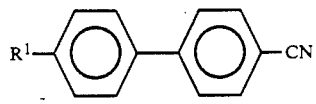
(I)

wherein $R^1$ is an alkyl group of 9, 10 or 11 carbon atoms,
and a component B comprising at least one member of 4-n-alkanoyloxy-4'-cyanobiphenyls represented by the formula (II)

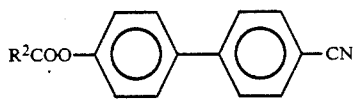
(II)

wherein $R^2$ is an alkyl group of 8 or 9 carbon atoms, and at least one member of 4-n-alkanoyloxy-4'-cyanobiphenyls represented by the formula (III)

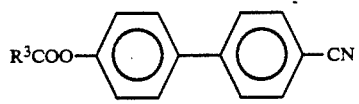
(III)

wherein $R^3$ is an alkyl group of 10, 11 or 12 carbon atoms, the ratio of the component A to the component B being in the range of 95:5 to 45:55.

Furthermore, another specific feature of the present invention is directed to a liquid crystal composition according to the above-mentioned composition, further comprising as a component C, at least one member of 4-n-alkoxy-4'-cyanobiphenyls represented by the formula (IV)

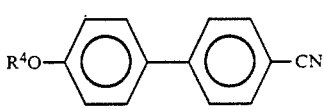
(IV)

wherein $R^4$ is an alkyl group of 8 to 12 carbon atoms.

In the component A of the liquid crystal composition according to the present invention, a weight ratio of 4-n-octyl-4'-cyanobiphenyl to 4-n-dodecyl-4'-cyanobiphenyl is in the range of 1:1 to 9:1, preferably 3:2 to 4:1. Furthermore, concrete examples of the 4-n-alkyl-4'-cyanobiphenyls represented by the formula (I) are (a) 4-n-nonyl-4'-cyanobiphenyl, (b) 4-n-decyl-4'-cyanobiphenyl and (c) 4-n-undecyl-4'-cyanobiphenyl. In the component A, 4-n-octyl-4'-cyanobiphenyl and 4-n-dodecyl-4'-cyanobiphenyl are contained in an amount of 40% or more. Preferably, the compounds of the formula (I) are used in the form of a mixture of the above-mentioned compounds (a), (b) and/or (c), and the weight ratio of the compound (a) to the compound (b) and/or (c) is preferably in the range of 7:3 to 3:7, more preferably about 1:1.

In the component B of the liquid crystal composition according to the present invention, the ratio of at least one member of the 4-n-alkanoyloxy-4'-cyanobiphenyls represented by the formula (II) to at least one member of the 4-n-alkanoyloxy-4'-cyanobiphenyls represented by the formula (III) is in the range of 55:45 to 95:5.

Moreover, the ratio of the component A to the component B which constitute the liquid crystal composition of the present invention is in the range of 95:5 to 45:55. When the content of the component B is more than 55%, the melting point of the composition is high, and when it is less than 5%, the effect of lowering the melting point is insufficient and the influence on NR is also slight.

The component C of the liquid crystal composition of the present invention is at least one member of the 4-n-alkoxy-4'-cyanobiphenyls represented by the formula (IV), but it is preferred that two or more of these compounds be used. The amount of the component C used is 25% or less, preferably 20% or less, of the total weight of the composition. When it exceeds 25%, the melting point of the composition, etc. are adversely affected.

The second specific feature of the present invention is directed to a liquid crystal display element for thermal writing characterized by using a liquid crystal composition which contains a component A comprising 4-n-octyl-4'-cyanobiphenyl, 4-n-dodecyl-4'-cyanobiphenyl and at least one member of 4-n-alkyl-4'-cyanobiphenyls represented by the formula (I)

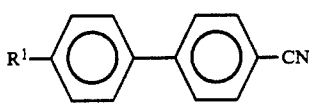
(I)

wherein $R^1$ is an alkyl group of 9, 10 or 11 carbon atoms,
and a component B comprising at least one member of 4-n-alkanoyloxy-4'-cyanobiphenyls represented by the formula (II)

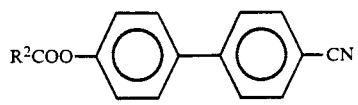

wherein $R^2$ is an alkyl group of 8 or 9 carbon atoms, and at least one member of 4-n-alkanoyloxy-4'-cyanobiphenyls represented by the formula (III)

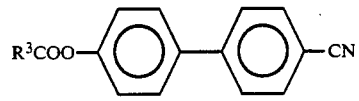

wherein $R^3$ is an alkyl group of 10, 11 or 12 carbon atoms, the ratio of the component A to the component B being in the range of 95:5 to 45:55.

Furthermore, another specific feature of the present invention is directed to a liquid crystal element for thermal writing characterized using a liquid crystal composition in which the components A and B further contain, as a component C, at least one member of 4-n-alkoxy-4'-cyanobiphenyls represented by the formula (IV)

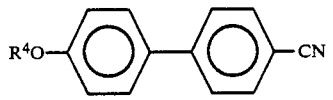

wherein $R^4$ is an alkyl group of 8 to 12 carbon atoms.

The liquid crystal composition of the present invention can be used together with a dye, a cholesteric liquid crystal and a high-temperature liquid crystal used for the adjustment of the NI point, etc.

As the dye, there can be employed a dichroic dye in a visible region which aims at improving color display or contrast, or a dichroic dye absorb energy of the wave length of laser beams, which dyes are used to adsorb the energy of laser beams and thereby improve the thermal efficiency. Such dichroic dyes may be those used for guest/host of liquid crystals. Typical examples of such dyes include azo dyes, anthraquinone dyes and squalirium dyes.

The content of the dye is 10% or less and usually 5% or less.

Typical examples of the cholesteric liquid crystal include 4'-cyano-4-(2'-methylbutyloxy)biphenyl, 4'-cyano-4-(2'-methylbutyl)biphenyl, 4'-(2-methylbutyloxy)benzoic acid-4'-cyanophenyl, 2-chloro-1,4-bis(4'-2-methylbutyloxybenzoyloxy)benzene, 4'-(2-methylbutyl)-4-biphenylcarboxylic acid-4'-pentylcyclohexyl ester. The content of the cholesteric liquid crystal is 30% or less and usually 20% or less.

Typical examples of the high-temperature liquid crystal include 4-n-nonyl-4''-cyanoterphenyl, 4-n-nonyloxy-4''-cyanoterphenyl, 4-(trans-4-n-nonylcyclohexyl)-4'-cyanobiphenyl, 1-(4'-n-hexylphenyl)-2-(4'-cyano-4-biphenyl)ethane, trans-4-n-nonylcyclohexanecarboxylic acid-4'-cyanobiphenyl ester, 1-(4'-n-hexylcyclohexyl)-2-(4'-cyano-4-biphenyl)ethane, trans-4-n-nonylbenzoic acid-4'-cyano-4-biphenyl ester and trans-4-n-nonyloxybenzoic acid-4'-cyano-4-biphenyl ester. The content of the high-temperature liquid crystal is 30% or less, and preferably 20% or less.

BEST MODE FOR CARRYING OUT THE INVENTION

Now, the present invention will be described in detail with reference to the following examples, but the scope of the present invention should not be limited to these examples.

EXAMPLES 1 TO 7

Liquid crystal compositions were prepared in accordance with predetermined proportions (% by weight) shown in Table 2, and their characteristics were then measured. The results are set forth in the same table.

COMPARATIVE EXAMPLES 1 to 9

Following the same procedure as in Examples 1 to 7 liquid crystal compositions were prepared, and their characteristics were then measured. The results are set forth in Table 3.

TABLE 2

| Component | Formula | Compound | Example 1 | 2 | 3 | 4 | 5 | 6 | 7 |
|---|---|---|---|---|---|---|---|---|---|
| A | | 4-n-octyl-4'-cyano-biphenyl | 28 | 50.4 | 53.2 | 35.3 | 35.3 | 47.9 | 29.4 |
| A | | 4-n-dodecyl-4'-cyano-biphenyl | 7.0 | 12.6 | 13.3 | 15.1 | 8.8 | 12.0 | 7.3 |
| A | I | $C_9H_{19}$—⬡—⬡—CN | 7.5 | 13.5 | 14.3 | 10.8 | 9.5 | 12.8 | 12.2 |
| A | I | $C_{10}H_{21}$—⬡—⬡—CN | 7.5 | 13.5 | 14.3 | 10.8 | 9.4 | 12.8 | 12.2 |
| B | II | $C_8H_{17}$—COO—⬡—⬡—CN | 17.5 | 3.5 | 1.8 | 12.6 | 9.0 | 1.6 | 18.8 |

TABLE 2-continued

| Component | Formula | Compound | Example 1 | 2 | 3 | 4 | 5 | 6 | 7 |
|---|---|---|---|---|---|---|---|---|---|
| B | II | $C_9H_{19}$—COO—⟨⟩—⟨⟩—CN | 24.4 | 4.9 | 2.4 | 8.4 | 15.7 | 2.2 | |
| B | III | $C_{11}H_{23}$—COO—⟨⟩—⟨⟩—CN | | | | | 2.8 | | |
| B | III | $C_{12}H_{25}$—COO—⟨⟩—⟨⟩—CN | 8.1 | 1.6 | 0.8 | 4.2 | 5.3 | 0.7 | 7.5 |
| C | IV | $C_8H_{17}$—O—⟨⟩—⟨⟩—CN | | | | | 5.6 | 5 | 12.6 |
| C | IV | $C_{12}H_{25}$—O—⟨⟩—⟨⟩—CN | | | | | 1.4 | 5 | |

The numeral values in the table denote the proportions (%) of the respective components.

| | 1 | 2 | 3 | 4 | 5 | 6 | 7 |
|---|---|---|---|---|---|---|---|
| cp (°C.) | 60.0 | 46.2 | 46.2 | 54.1 | 57.1 | 50.2 | 57.8 |
| SN point (°C.) | 59.1 | 44.5 | 44.3 | 53.8 | 56.3 | 48.6 | 56.3 |
| NR (°C.) | 0.9 | 1.7 | 1.9 | 0.3 | 0.8 | 1.6 | 1.5 |
| Melt Starting Point (°C.) | −9 | −27 | −12 | −17 | −20 | −24 | |
| Melt Ending Point (°C.) | −3 | −24 | −3 | −11 | −10 | −9 | −16 |

TABLE 3

| Component | Formula | Compound | Comparative Example 1 | 2 | 3 | 4 | 5 | 6 | 7 | 8 | 9 |
|---|---|---|---|---|---|---|---|---|---|---|---|
| H | | 4-n-octyl-4′-cyano-biphenyl | 56 | | 22.4 | | | 50.4 | 57.9 | . | 60 |
| A | | 4-n-dodecyl-4′-cyano-biphenyl | 14 | | 5.6 | | | 12.6 | | | 40 |
| A | I | $C_9H_{19}$—⟨⟩—⟨⟩—CN | 15 | | 6.0 | | | 13.5 | | | |
| A | I | $C_{10}H_{21}$—⟨⟩—⟨⟩—CN | 15 | | 6.0 | | | 13.5 | 17.1 | | |
| B | II | $C_8H_{17}$—COO—⟨⟩—⟨⟩—CN | | 35.0 | 21.0 | 30 | | | | | |
| B | II | $C_9H_{19}$—COO—⟨⟩—⟨⟩—CN | | 48.8 | 29.3 | 52.5 | | | 25.0 | | |
| B | III | $C_{11}H_{23}$—COO—⟨⟩—⟨⟩—CN | | | | | | | | | |

TABLE 3-continued

| Component | Formula | Compound | Comparative Example | | | | | | | | |
|---|---|---|---|---|---|---|---|---|---|---|---|
| | | | 1 | 2 | 3 | 4 | 5 | 6 | 7 | 8 | 9 |
| B | III | 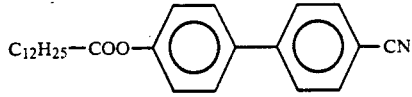 C$_{12}$H$_{25}$—COO—⟨⟩—⟨⟩—CN | | 16.2 | 9.8 | 17.5 | | | | | |
| C | IV | 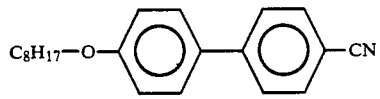 C$_8$H$_{17}$—O—⟨⟩—⟨⟩—CN | | | | | 80 | 8.0 | | 50 | |
| C | IV | 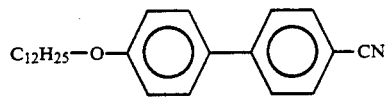 C$_{12}$H$_{25}$—O—⟨⟩—⟨⟩—CN | | | | | 20 | 2.0 | | 50 | |

The numeral values in the table denote the proportions (%) of the respective components.

| | | | | | | | | | |
|---|---|---|---|---|---|---|---|---|---|
| cp (°C.) | 44.7 | 78.1 | | 78.7 | 80.5 | 47.8 | 50.4 | 82.3 | 46.2 |
| SN point (°C.) | 42.7 | 76.4 | | 77.4 | 74.2 | 45.0 | 47.4 | none | 45.8 |
| NR (°C.) | 2.0 | 1.7 | | 1.3 | 6.3 | 2.8 | 3.0 | | 0.4 |
| Melt Starting Point (°C.) | −8 | 18 | −4 | 18 | 31 | −16 | −22 | 43.6 | 7 |
| Melt Ending Point (°C.) | 0 | 21 | 3 | 30 | 43 | −3 | −14 | 51.3 | 21 |

INDUSTRIAL USAGE

The liquid crystal composition and the liquid crystal element of the present invention are characterized by having an extremely narrow nematic phase temperature range and a low-melting phase transition point, and therefore they are suitable to use for thermal writing liquid crystal displays.

In the liquid crystal composition of the present invention, a nematic range can be actually set to a level of 2° C. or lower, and thus a writing rate of the display element can be accelerated. In addition, the contrast on a projection screen is good, whereby display quality level can be improved remarkably. Since the composition has a melting point of 0° C. or lower, the liquid crystal composition of the present invention can be used for thermal writing type liquid crystal displays without any problems even when utilized indoors and at room temperature. Thus, the liquid crystal composition is a practically usable liquid crystal material.

We claim:

1. A liquid crystal composition having a nematic range of no more than 2 C° and a melting point of no higher than 0° C., said composition mainly comprising a component A including 4-n-octyl-4'-cyanobiphenyl, 4-n-dodecyl-4'-cyanobiphenyl and at least one member of 4-n-alkyl-4'-cyanobiphenyls represented by the formula (I)

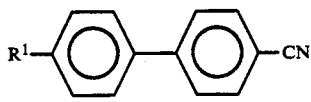

$$R^1-\langle\bigcirc\rangle-\langle\bigcirc\rangle-CN \quad (I)$$

wherein $R^1$ is an alkyl group of 9, 10 or 11 carbon atoms, and a component B comprising at least one member of 4-n-alkanoyloxy-4'-cyanobiphenyls represented by the formula (II)

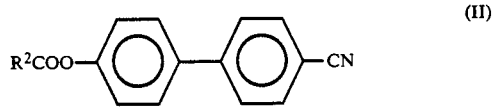

$$R^2COO-\langle\bigcirc\rangle-\langle\bigcirc\rangle-CN \quad (II)$$

wherein $R^2$ is an alkyl group of 8 or 9 carbon atoms, at least one member of 4-n-alkanoyloxy-4'-cyanobiphenyls represented by the formula (III)

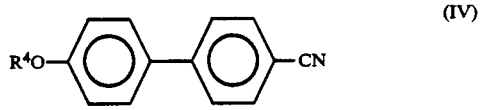

$$R^3COO-\langle\bigcirc\rangle-\langle\bigcirc\rangle-CN \quad (III)$$

wherein $R^3$ is an alkyl group of 10, 11 or 12 carbon atoms, the ratio of the component A to the component B being in the range of 95:5 to 45:55.

2. A liquid crystal composition according to claim 1 further comprising at least one member of 4-n-alkoxy-4'-cyanobiphenyls represented by the formula (IV)

$$R^4O-\langle\bigcirc\rangle-\langle\bigcirc\rangle-CN \quad (IV)$$

wherein $R^4$ is an alkyl group of 8 to 12 carbon atoms.

3. A liquid crystal composition according to claim 1 wherein the ratio of 4-n-octyl-4'-cyanobiphenyl to 4-n-dodecyl-4'-cyanobiphenyl is in the range of 1:1 to 9:1; both of these compounds are contained in an amount of 40% or more in the component A; and the ratio of at least one member of 4-n-alkanoyloxy-4'-cyanobiphenyls represented by the formula (II) to at least one member of 4-n-alkanoyloxy-4'-cyanobiphenyls represented by the formula (III) is in the range of 55:45 to 95:5.

4. A liquid crystal composition according to claim 1 including compounds of formula (I) wherein $R^1$ comprises alkyl groups having 9 and 10 carbon atoms; compounds of formula (II) wherein $R^2$ comprises alkyl groups having 8 and 9 carbon atoms and compounds of formula (III) wherein R³ comprises alkyl groups having 11 and 12 carbon atoms.

5. A liquid crystal composition according to claim 2 wherein the ratio of 4-n-octyl-4'-cyanobiphenyl to 4-n-dodecyl-4'-cyanobiphenyl is in the range of 1:1 to 9:1; both of these compounds are contained in an amount of 40% or more in the component A; and the ratio of at least one member of 4-n-alkanoyloxy-4'-cyanobiphenyls represented by the formula (II) to at least one member of 4-n-alkanoyloxy-4'-cyanobiphenyls represented by the formula (III) is in the range of 55:45 to 95:5.

6. A liquid crystal composition according to claim 2 including compounds of formula (I) wherein R¹ comprises alkyl groups having 9 and 10 carbon atoms; compounds of formula (II) wherein R² comprises alkyl groups having 8 and 9 carbon atoms; compounds of formula (III) wherein R³ comprises an alkyl group having 12 carbon atoms; and compounds of formula (IV) wherein R⁴ comprises alkyl groups having 8 and 12 carbon atoms.

7. A liquid crystal display element for thermal writing including a liquid crystal composition having a nematic range of no more than 2 C° and a melting point of no higher than 0° C., mainly comprising a component A including 4-n-octyl-4'-cyanobiphenyl, 4-n-dodecyl-4'-cyanobiphenyl and at least one member of 4-n-alkyl-4'-cyanobiphenyls represented by the formula (I)

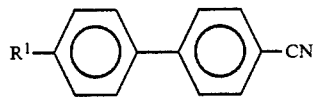

wherein R¹ is an alkyl group of 9, 10 or 11 carbon atoms, and a component B comprising at least one member of 4-n-alkanoyloxy-4'-cyanobiphenyls represented by the formula (II)

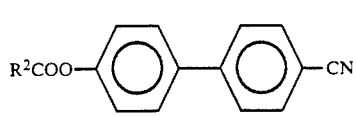

wherein R² is an alkyl group of 8 or 9 carbon atoms, and at least one member of 4-n-alkanoyloxy-4'-cyanobiphenyls represented by the formula (III)

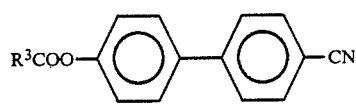

wherein R³ is an alkyl group of 10, 11 or 12 carbon atoms, the ratio of the component A to the component B being in the range of 95:5 to 45:55.

8. A liquid crystal display element for thermal writing including a liquid crystal composition according to claim 7, further comprising at least one member of 4-n-alkoxy-4'-cyanobiphenyls represented by the formula (IV)

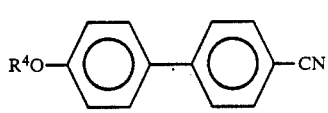

wherein R⁴ is an alkyl group of 8 to 12 carbon atoms.

9. A liquid crystal display element for thermal writing according to claim 8 including compounds of formula (I) wherein R¹ comprises alkyl groups having 9 and 10 carbon atoms; compounds of formula (II) wherein R² comprises alkyl groups having 8 and 9 carbon atoms; compounds of formula (III) wherein R³ comprises an alkyl group having 12 carbon atoms; and compounds of formula (IV) wherein R⁴ comprises alkyl groups having 8 and 12 carbon atoms.

* * * * *